United States Patent [19]

Powell et al.

[11] Patent Number: 5,682,138
[45] Date of Patent: Oct. 28, 1997

[54] ILLUMINATION SYSTEM FOR A SEMI-TRAILER OR THE LIKE

[76] Inventors: Richard A. Powell, 470 Belmont, N.W.; Robert P. Powell, 611 Hall St., N.W., both of Warren, Ohio 44483

[21] Appl. No.: 645,610

[22] Filed: May 14, 1996

[51] Int. Cl.⁶ .................................................. B60Q 1/00
[52] U.S. Cl. ..................... 340/475; 340/431; 340/465; 340/468; 362/61; 362/80
[58] Field of Search .................. 340/425.5, 431, 340/433, 438, 463, 465, 468, 471, 472, 473, 475; 362/61, 64, 78, 80, 83.3

[56] References Cited

U.S. PATENT DOCUMENTS

| | | | |
|---|---|---|---|
| 1,802,958 | 4/1931 | Ravencroft . | |
| 1,937,724 | 12/1933 | Somers | 177/329 |
| 2,602,849 | 7/1952 | Lawson et al. | 177/337 |
| 2,934,744 | 4/1960 | Schutte | 340/76 |
| 3,017,500 | 1/1962 | Pezzopane | 240/8.2 |
| 3,435,200 | 3/1969 | Massoll et al. | 240/8.2 |
| 3,855,462 | 12/1974 | Kondo | 240/8.24 |
| 4,622,626 | 11/1986 | Sassmannshausen | 362/30 |
| 4,631,642 | 12/1986 | Brun | 362/32 |
| 4,827,388 | 5/1989 | Miyazawa | 362/284 |
| 4,964,022 | 10/1990 | Lane | 362/80 |
| 5,073,768 | 12/1991 | Willaredt | 340/431 |
| 5,430,625 | 7/1995 | Abarr et al. | 340/475 |
| 5,497,304 | 3/1996 | Caine | 340/478 |

*Primary Examiner*—Donnie L. Crosland
*Assistant Examiner*—Edward Lefkowitz
*Attorney, Agent, or Firm*—Myers, Liniak & Berenato

[57] ABSTRACT

An illumination system for illuminating the rear wheel assembly of a wheeled vehicle for a predetermined period of time in response to actuation of a turn signal. An auxiliary light and corresponding circuit are provided on the underside of a semi-trailer or other wheeled vehicle, the light being turned on in response to actuation of the turn signal on the same side of the vehicle so as to illuminate the rear wheel assembly. The light remains on for a predetermined period of time after the turn signal is turned off or deactuated, due to the dissipation of charge in a storage capacitor provided in the circuit. The circuit operatively associated with the auxiliary light is provided with a switching transistor as well as the storage capacitor, the transistor functioning to cause the auxiliary light to be illuminated when both (i) the vehicle's lights are on; and (ii) the turn signal on the appropriate side of the vehicle is actuated.

15 Claims, 2 Drawing Sheets

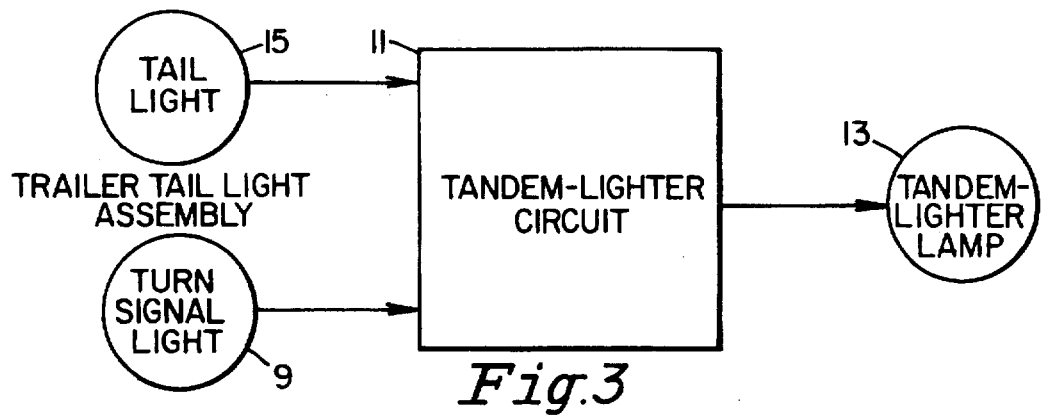
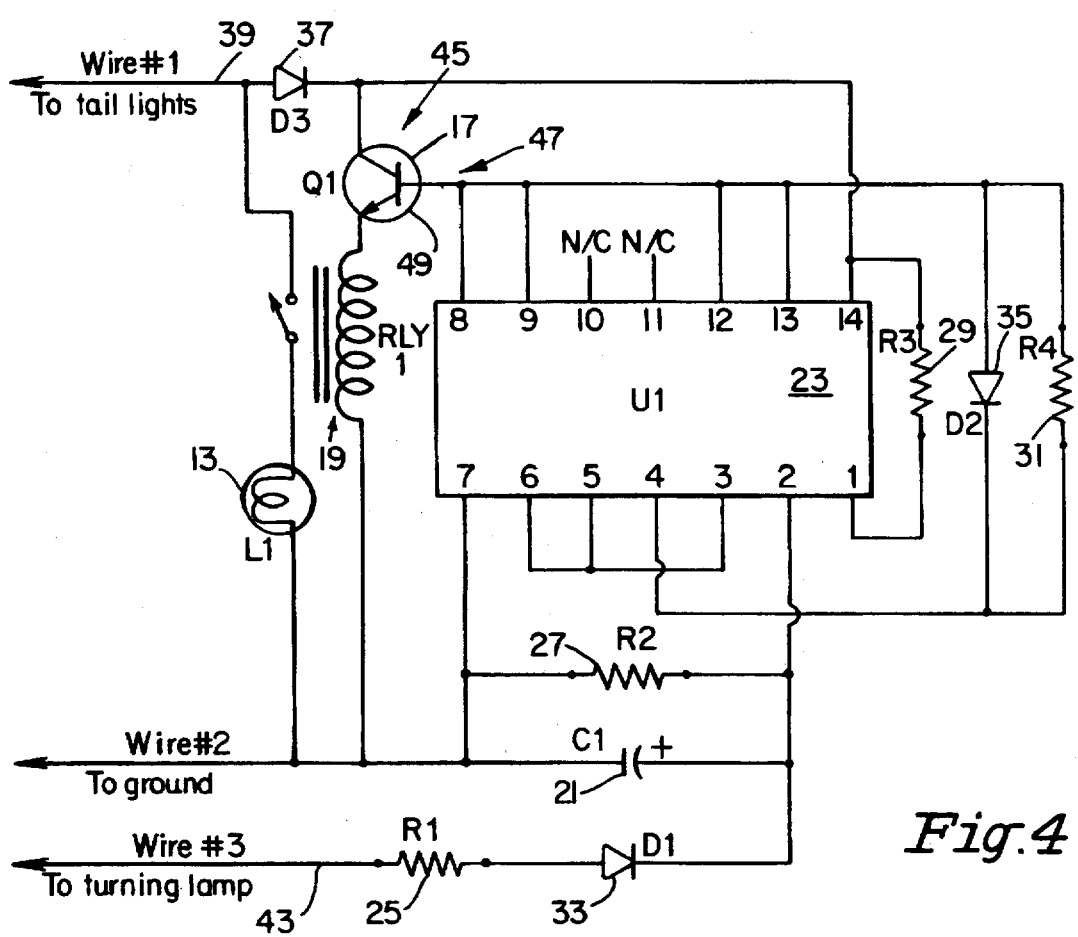
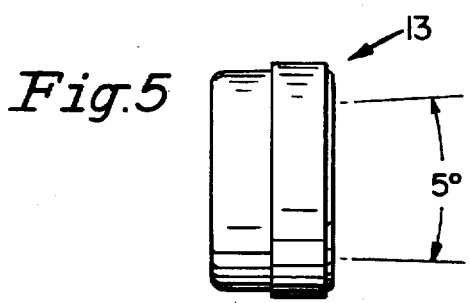
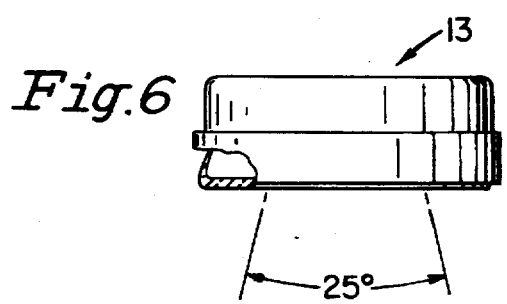

ILLUMINATION SYSTEM FOR A SEMI-TRAILER OR THE LIKE

This invention relates to an illumination system adapted to be mounted on a wheeled vehicle. More particularly, this invention relates to an auxiliary lighting system including a corresponding circuit for illuminating the rear wheel assembly of a wheeled vehicle (e.g. trailer) for a predetermined period of time in response to actuation of a turn signal.

BACKGROUND OF THE INVENTION

The provision of lights on motor vehicles for illuminating the wheel assemblies is old and well-known throughout the art. For example, U.S. Pat. No. 3,017,500 discloses an automobile including light casings mounted in openings above the wheels of the vehicle so that the wheel assemblies are illuminated when the lights are in their actuated or on state. That system is provided for the purpose of facilitating the removal/replacement of tires on the vehicle. Unfortunately, the system of the '500 patent does not take into consideration the need to illuminate wheel assemblies during operation of the vehicle during select driving procedures (e.g. turns, backing up in darkened conditions, etc.). Accordingly, the wheel lights of the '500 patent are connected to the ignition system of the vehicle, or provided with an independent actuation switch.

U.S. Pat. No. 4,964,022 discloses a lighting system mounted on a school bus for the purpose of illuminating the region adjacent the doors of the bus as a safety precaution for students exiting or entering the bus. Again, the illumination system of the '022 patent does not appreciate the need for illuminating wheel assembly areas during certain driving procedures. Thus the auxiliary lights of the '022 patent are simply turned on automatically when the doors of the bus are opened. Alternatively, these side lights can be turned on and off at the same time the red flashing lights of the bus are activated during receipt or discharge of students.

U.S. Pat. No. 3,855,462 discloses a headlight system for a wheeled vehicle which includes lateral lighting for directing light to a side of the vehicle in response to steering operations in that direction. Selective switches are arranged on the front axle so that they are both open when the car moves in a straight line or straight direction, with one of the switches being closed when the car goes into a significant turn in either the right-hand or left-hand direction. The direction of the turn dictates which switch is closed. In response to closing of the appropriate switch, a laterally facing light bulb is illuminated in order to light up the front/side of the vehicle going into the turn. Unfortunately, because the illumination system of the '462 patent functions in response to movement of the steering wheel, the only way for the operator of the vehicle to turn on these auxiliary lights is to rotate the steering wheel a predetermined amount. Thus, (i) the illumination system of the '462 patent is useless before the vehicle goes into its turn (e.g. during procedures such as backing up in a straight line at night); (ii) the system of the '462 patent does not illuminate the side of the vehicle during the first part of the turn before the wheels are turned a predetermined amount; and (iii) the laterally facing lights are subject to being turned on by simple steering wheel rotation when the vehicle is not moving.

U.S. Pat. No. 3,435,200 discloses a cornering lamp assembly for a wheeled vehicle which is actuated in response to movement of the turn signal lever. A cornering bulb is connected to the electrical system of the vehicle and adapted to be energized whenever the turn signal is actuated or the transmission lever is placed in the reverse position. When the turn signal lever is moved in a counterclockwise direction to indicate a left-turn, for example, this causes a rod and corresponding valve member to be shifted axially to connect a pair of ports which causes the piston head to be drawn to the left so that the louvers are shifted to a position causing the light beam to be directed toward the side of the vehicle. Unfortunately, the system of the '200 patent is highly complex mechanically thus rendering it inefficient, costly to manufacture, and difficult to maintain.

Additionally, none of the patents discussed above discuss or recognize a problem found to exist with respect to the operation of semi-trailers. It has been found that in both the forward and reverse directions, it would be helpful to be able to illuminate the rear wheel assemblies of such trailers during turns, and other inherently hazardous operations so that the operator can more easily identify potential objects, or obstacles, of concern such as curbs, parked vehicles, etc.

In view of the above, it is apparent that there exists a need in the art for an improved illumination system for lighting the rear wheel assembly(ies) of a wheeled vehicle such as a semi-trailer in response to actuation of a turn signal so that the operator can more easily identify potential obstacles during predetermined types of driving operations.

It is a purpose of this invention to fulfill the above-described needs in the art, as well as other needs apparent to the skilled artisan from the following detailed description of this invention.

SUMMARY OF THE INVENTION

Generally speaking, this invention fulfills the above-described needs in the art by providing an illumination system adapted to be mounted on or adjacent the side of a trailer for the purpose of illuminating a rear wheel assembly thereof in response to actuation of a turn signal, the illumination system comprising:

a light for illuminating the rear wheel assembly of the trailer in response to actuation of the turn signal; and circuit means in electrical communication with the turn signal assembly of the trailer, the circuit means for energizing the light for a predetermined period of time in response to actuation of the turn signal so that the light is turned on and illuminates the rear wheel assembly of the trailer in anticipation of and during turns.

According to certain preferred embodiments, the circuit means further includes a first wire connected to ground, a second wire connected to a tail light assembly wire, and a third wire connected to the turn signal, wherein the circuit means is powered by the tail light assembly and will not operate unless the tail light assembly is in its on or actuated state.

According to further preferred embodiments, the circuit means causes the light to be illuminated when the rear turn signal assembly is in its energized or on state, and the predetermined period of time begins when the turn signal is de-energized or turned off.

This invention still further fulfills the above-described needs in the art by providing a method of illuminating a wheel assembly of a vehicle, the method comprising the steps of:

providing an auxiliary light to be mounted on the vehicle for illuminating the wheel assembly;

providing an auxiliary light circuit, including a charge storage element, operatively associated with the auxiliary light and connected to a tail light assembly of the vehicle;

turning on the tail light assembly of the vehicle thereby energizing the auxiliary circuit so that the auxiliary light can only be turned on when the tail light assembly is in its actuated or on state;

turning on a turn signal of the vehicle, the turning on of the turn signal (i) causing the auxiliary circuit to switch on the auxiliary light in order to illuminate the wheel assembly, and (ii) charging up the storage element in the auxiliary circuit;

causing the turn signal to be turned off or deactivated; and continuing to illuminate the wheel assembly with the auxiliary light after the turn signal has been turned off by dissipating the charge in the storage element so that the auxiliary light remains on for a predetermined period of time following the turning off of the turn signal.

IN THE DRAWINGS

FIG. 1 is a perspective view of a semi-trailer including the auxiliary lighting system according to an embodiment of this invention, the system for illuminating the rear wheel assembly of the trailer during turns and the like.

FIG. 2 is a perspective view illustrating the trailer of FIG. 1 from the bottom thereof, FIG. 2 illustrating the lighting system mounted to the underside of the trailer.

FIG. 3 is a schematic or block diagram illustrating the auxiliary circuit associated with the auxiliary light, the circuit being in communication with both the tail light and turn signal systems of the trailer.

FIG. 4 is an electrical diagram of the auxiliary circuit shown in FIG. 3 which causes the auxiliary light to illuminate the wheel assembly in response to actuation of the turn signal, and for a predetermined period of time following deactuation of the turn signal.

FIG. 5 is a side elevational view of the auxiliary light of FIGS. 1–4.

FIG. 6 is a top elevational view of the auxiliary light of FIGS. 1–5.

DETAILED DESCRIPTION OF CERTAIN EMBODIMENTS OF THIS INVENTION

Figures 1, 2:
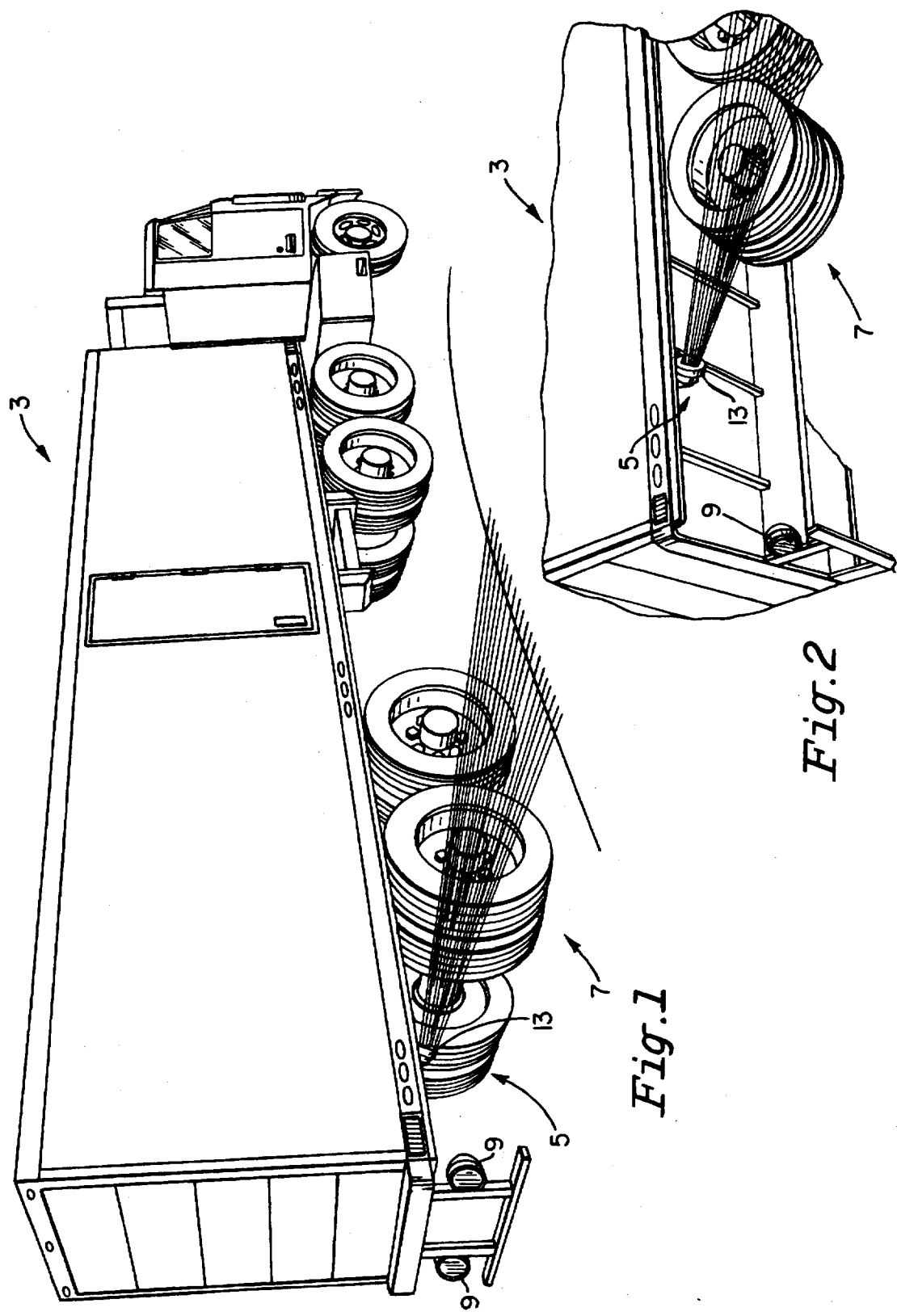

This invention will now be described with reference to the following figures in which like reference numerals indicate like parts throughout the several views.

It will be appreciated by those of skill in the art that the illumination system according to this invention may be used in conjunction with any type of wheeled vehicle (e.g. truck, car, etc.). However, the invention is described below in a preferred embodiment in which it is used in conjunction with a trailer to be pulled by a tractor.

FIG. 1 is a perspective view illustrating semi-trailer 3 including auxiliary lighting system(s) 5 for illuminating rear wheel assembly 7 according to an embodiment of this invention. Auxiliary lighting system 5 functions to illuminate the wheel assembly 7 on its side of the trailer in response to actuation by the trailer operator of the corresponding turn signal 9. For example, when the operator of trailer 3 actuates the right-hand turn signal, the auxiliary lighting system 5 on the right-hand side of the trailer is caused to illuminate its adjacent wheel assembly 7. On the other hand, when the left-hand turn signal 9 is actuated by the trailer operator, the auxiliary lighting system 5 on the left-hand side of the trailer is caused to illuminate the rear wheel assembly 7 on the left-hand side of the trailer. Separate illumination systems 5 are provided on each side of the trailer.

FIG. 2 is a partial perspective view of trailer 3 illustrating auxiliary lighting system 5 affixed to the underside of the trailer behind rear wheel assembly 7. Light 13 of system 5 is aimed or directed toward wheel assembly 7 and the surrounding roadway so as to illuminate same during turns and the like in response to actuation of the corresponding turn signal. Accordingly, the trailer operator is able to see potential obstacles during turns, backing up at night, etc.

FIG. 3 is a schematic/block diagram of the circuitry associated with auxiliary lighting system 5 according to an embodiment of this invention. System 5 includes auxiliary circuit 11 which functions to illuminate light or lamp 13 in response to actuation of tail light 15 and the corresponding turn signal 9. Thus, when both tail light 15 of trailer 3 and the corresponding turn signal 9 are actuated by the trailer operator, auxiliary circuit 11 causes light 13 to illuminate the rear wheel assembly 7 at which the light 13 is directed.

If the trailer's hazards (or four-way flashers) are turned on, both the right and left-hand illumination systems 5 will become illuminated. This is useful, for example, when backing up at night.

FIG. 4 is a circuit diagram of auxiliary circuit 11 of system 5, circuit 11 being operatively associated with light 13 within illumination system 5. Auxiliary circuit 11 includes transistor 17, coil inclusive relay 19, storage capacitor 21, multi-pin integrated circuit (IC) 23, resistors 25, 27, 29, and 31, diodes 33, 35, and 37, wire 39 connected to a corresponding wire in the appropriate tail light assembly 15, wire 41 connected to ground, and, finally, wire 43 connected to or in electrical communication with the corresponding rear turn signal lamp 9. As illustrated light 13 is provided within circuit 11 so as to be actuated in response to both the tail lights and corresponding turn signal being turned on by the operator of the vehicle.

The auxiliary lighting system 5 including auxiliary circuit 11 and light 13, and operates on 12 volts direct current (DC). Wires 39, 41, and 43 extend from circuit 11 so that illumination system 11 may be provided as an add-on or optional element on existing trailers 3. In other words, system(s) 5 may be installed on an existing trailer without having to modify the trailer's or tractor's wiring system(s), so that any tractor with a standard wiring system can be used to pull a trailer including system(s) 5.

Wire 39 extending from circuit 11 communicates with the trailer's tail light circuit, wire 41 to ground, and wire 43 extending from circuit 11 connects to the turn signal circuit on the same side of the vehicle as the system 5 is located. A separate illumination system 5, including its own circuit 11 and own light 13, may, of course, be provided on each side of trailer 3, the left-hand system 5 for illuminating the left-hand rear wheel assembly and the right-hand system for illuminating the right-hand rear wheel assembly.

When either of the parking lights or headlights/main lights of trailer 3 are turned on by the operator, this causes the tail lights of the trailer to be turned on. When the tail lights are turned on, 12 volts DC is applied to collector 45 of transistor 17 and to pin 14 of integrated circuit (IC) 23, all by way of wire 39 and diode 37. The 12 volts from the tail lights energize circuit 11. However, light 13 is not turned on in response to only the actuation of the trailer tail lights. Auxiliary light 13 remains off or deactuated when only the tail lights are turned on.

Then, when the trailer's corresponding turn signal is turned on, a 12 volt DC pulse is applied to diode 33 and resistor 25 through wire 43. The 12 volt DC pulse through resistor 25 and diode 33 continues when the turn signal is on and causes storage capacitor 21 to charge and supplies a holding voltage to pin number 2 of IC 23. Integrated circuit 23 may be, for example, a known CD 4011 CMOS Quad two input NAND gate device. Pin number 2 of IC 23 being high causes pin numbers 3, 5, and 6 of integrated circuit 23 to go low. When this occurs, pin number 4 of IC 23 becomes high and is fed through resistor 31 to base 47 of transistor 17 causing the transistor to go high or transmit (i.e. switch on).

When transistor 17 is in its conducting or transmitting state, voltage is supplied from its emitter 49 through the coil of relay 19 to ground via wire 41. When relay 19 is energized, this causes auxiliary light 13 to illuminate or become energized. After the turn signal is turned off, the pulse through wire 43 stops, but light 13 remains illuminated or lit for a predetermined period of time (e.g. from about 3-10 seconds) as the charge in the capacitor dissipates. The time period for which light 13 remains illuminated after the turn signal is turned off is dictated or determined by the values of storage capacitor 21 and resistor 27, which are arranged in parallel with one another.

According to certain embodiments of this invention, storage capacitor 21 is an electrolytic type capacitor and has a value of about 10 microFarads ($\mu$F) and resistor 27 has a value of about 820 (k$\Omega$). As will be appreciated by those of skill in the art, other known charge storing elements may be used instead of this capacitor. Resistors 25, 29, and 31 have resistance values of about 100 ohms, 10 k$\Omega$, and 1.2 k$\Omega$, respectively. Meanwhile, transistor 17 may be a PN 2222 type, and diodes 33, 35, and 37 are 1N4002. Relay 19 may be a 400 ohm coil, 15 amp contact type relay, while IC 23 is a CD 4011. Diode 35 functions as a buffer or bias for transistor 17.

FIG. 5 is a side elevational view of light 13, this view illustrating the 5° arc over which light 13 emits rays. FIG. 6, a top view, illustrates the 25° arc (horizontal pattern) over which light 13 emits rays. This 5° by 25° illumination zone of light 13 functions to illuminate the adjacent rear wheel assembly of trailer 3 and the surrounding roadway when the light is energized by auxiliary circuit 11. As will be appreciated by those of skill in the art, any suitable light 13 with a satisfactory illumination field may be used.

Once given the above disclosure, many other features, modifications, and improvements will become apparent to the skilled artisan. Such other features, modifications, and improvements are therefore considered to be a part of this invention, the scope of which is to be determined by the following claims.

We claim:

1. An illumination system adapted to be mounted on or adjacent the side of a trailer for illuminating a rear wheel assembly thereof in response to actuation of a turn signal, the illumination system comprising:

a light for illuminating the rear wheel assembly of the trailer in response to actuation of the turn signal;

circuit means in electrical communication with the turn signal of the trailer, said circuit means for energizing said light for a predetermined period of time in response to actuation of said turn signal so that said light is turned on and illuminates the rear wheel assembly of the trailer in anticipation of or during turns; and wherein said circuit means further includes a first wire connected to ground, a second wire connected to a tail light assembly wire, and a third wire connected to said turn signal, and wherein said circuit means is powered by the tail light assembly and will not operate unless the tail light assembly is in its on state.

2. The illumination system of claim 1, further comprising means for mounting said light and said circuit means on the underside of the trailer behind the wheel assembly.

3. The illumination system of claim 1, wherein said predetermined period of time is from about 3-10 seconds.

4. The illumination system of claim 1, wherein said circuit means causes said light to be illuminated when the rear turn signal assembly is in its energized state and said predetermined period of time begins when the turn signal is de-energized or turned off.

5. The illumination system of claim 4, wherein said circuit means includes a resistor and a capacitor arranged in parallel whose values both dictate the length of said predetermined period of time.

6. The illumination system of claim 5, wherein said circuit means further includes a transistor having a base, a collector and an emitter, said transistor collector being connected to said second wire and the tail light assembly, and said transistor emitter being connected to ground and said light.

7. The illumination system of claim 6, wherein said circuit means further includes a relay disposed between said light and said emitter.

8. The illumination system of claim 7, wherein said circuit means further includes an integrated circuit having a plurality of pins, and wherein said resistor and said capacitor are in parallel with one another and are connected to the same pins of said integrated circuit.

9. The illumination system of claim 1 wherein said predetermined time period is greater than about 3 seconds.

10. A semi-trailer comprising the illumination system of claim 1.

11. A method of illuminating a wheel assembly of a wheeled vehicle in response to actuation of a turn signal, the method comprising the steps of:

providing an auxiliary light to be mounted on the vehicle for illuminating the wheel assembly;

providing an auxiliary light circuit, including a storage element, operatively associated with the auxiliary light and connected to both the turn signal and a tail light assembly of the vehicle;

turning on the tail light assembly of the vehicle thereby energizing the auxiliary circuit so that the auxiliary light can only be turned on when the tail light assembly is on;

turning on the turn signal, said turning on of the turn signal (i) causing the auxiliary circuit to switch on the auxiliary light in order to illuminate the wheel assembly, and (ii) charging up the storage element in the auxiliary circuit;

causing the turn signal to be turned off or deactivated; and continuing to illuminate the wheel assembly with the auxiliary light after turning off the turn signal by dissipating the charge in the storage element so that the auxiliary light remains on for a predetermined period of time following said turning off of the turn signal.

12. The method of claim 11 wherein the predetermined period of time that the light remains on after the turn signal has been turned off is from about 3-10 seconds.

13. The method of claim 11 further comprising the steps of:

providing a coil inclusive relay between the light and a transistor in the auxiliary circuit; and causing the transistor to switch into a conductive state when both the turn signal and tail light of the vehicle are turned on thereby energizing the light.

14. The method of claim 13 wherein the vehicle is a trailer and the storage element is a capacitor.

15. An auxiliary lighting system adapted to be positioned on a wheeled vehicle for illuminating a wheel assembly thereof, the lighting system comprising:

a light for emitting light rays;

a circuit operatively associated with said light, said circuit including:
- a) a first wire adapted to be connected to a tail lighting system of the vehicle;
- b) a second wire adapted to be connected to ground;
- c) a third wire adapted to be connected to a turn signal member of the vehicle;
- d) an integrated circuit interconnecting said first, second, and third wires;
- e) a storage element for accumulating charge when said third wire is energized with voltage from the turn signal member; and
- f) means for energizing said light in response to said storage element being charged, said means for both (i) energizing said light during charging of said storage element, and (ii) energizing said light during dissipation of charge in said storage element.

* * * * *